(12) United States Patent
Yarkosky

(10) Patent No.: US 7,408,974 B2
(45) Date of Patent: Aug. 5, 2008

(54) COMPOSITE CODE-DIVISION/TIME-DIVISION MULTIPLEX SYSTEM

(75) Inventor: Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 638 days.

(21) Appl. No.: 11/126,548

(22) Filed: May 11, 2005

(65) Prior Publication Data

US 2006/0256838 A1 Nov. 16, 2006

(51) Int. Cl.
*H04B 1/00* (2006.01)

(52) U.S. Cl. .................................. 375/131; 455/447

(58) Field of Classification Search ................. 375/131, 375/146, 260, 267, 285; 455/443, 446–447, 455/451; 370/294, 329–330, 335, 348, 350
See application file for complete search history.

(56) References Cited

U.S. PATENT DOCUMENTS

| | | | |
|---|---|---|---|
| 5,850,608 A * | 12/1998 | Faruque | 455/447 |
| 6,088,347 A * | 7/2000 | Minn et al. | 370/342 |
| 6,122,266 A * | 9/2000 | Lynch | 370/335 |
| 6,151,484 A * | 11/2000 | Ramesh | 455/68 |
| 6,212,385 B1 * | 4/2001 | Thomas et al. | 455/447 |
| 6,330,458 B1 * | 12/2001 | Lamoureux et al. | 455/561 |
| 6,360,107 B1 * | 3/2002 | Lin et al. | 455/562.1 |
| 6,654,612 B1 * | 11/2003 | Avidor et al. | 455/450 |
| 6,741,582 B1 | 5/2004 | Mansour | |
| 6,907,246 B2 * | 6/2005 | Xu et al. | 455/447 |
| 2005/0026640 A1* | 2/2005 | Pan | 455/517 |

FOREIGN PATENT DOCUMENTS

| | | |
|---|---|---|
| EP | 0 862 343 A2 | 9/1998 |
| EP | 1 501 219 A1 | 1/2005 |

OTHER PUBLICATIONS

Chang, Chu Rui, et al., "PN Offset Planning Strategies For Non-Uniform CDMA Networks," Vehicular Technology Conference, 1997, IEEE 47th Phoenix, AZ, USA May 4-7, 1997, New York, NY, IEEE, US, vol. 3, May 4, 1997, pp. 1543-1547.
International Search Report from International Application No. PCT/US2006/017218.

* cited by examiner

*Primary Examiner*—Khanh C Tran

(57) ABSTRACT

Increased data communication capacity in a sector of a CDMA wireless system using a combination of code division multiplexing and time division multiplexing. Adjacent sub-sectors may transmit carrier signals having the same frequency and using the same Walsh codes may be used by imposing a partial offset of the sector PN sequence.

22 Claims, 3 Drawing Sheets

COMPOSITE CODE-DIVISION/TIME-DIVISION MULTIPLEX SYSTEM

BACKGROUND

A. Field of Invention

The present invention is related to wireless communication systems, and more particularly, to a method and system of increasing the forward channel capacity in a CDMA communication network. It is particularly useful for providing high rate data communications to a plurality of users.

B. Description of Related Art

In a typical wireless communication system, an area is divided geographically into a number of cell sites, each defined by one or more radiation patterns created by an emission of radio frequency (RF) electromagnetic (EM) waves from a respective base transceiver station (BTS) antenna. Each cell site is typically further divided into two, three, or more sectors, where the sectors provide radio coverage for a selected area within the cell site. Each sector of the cell typically uses dedicated antennas to provide the required coverage.

Changes in the CDMA specifications set forth in CDMA2000 increased capacity in the forward and reverse channels. In particular, the SNR requirements for each channel (forward and reverse) have been improved. The IS 2000 specification doubled Walsh code space over IS95 to provide 128 Walsh codes, thereby doubling the forward channel capacity.

CDMA networks have been improved to provide data services, referred to as 1xEVDO (Evolution, Data Only). In 1xEVDO, an entire carrier (1.25 MHz modulated bandwidth) is dedicated to high-speed packet data, while one or more additional carriers are used in the normal manner for voice. In such a system, all of the forward link resources are used to send data to a single user for a given time period, or time slot. In other time slots, the channel is used to provide data bursts to additional users. More specifically, 1xEVDO operates in the forward link by segregating the forward link into time slices of 26.67 ms. For the period of the 26.67 ms, a single user is given all of the RF resources in order to deliver packet data information to an end terminal requesting data.

As a further evolution of CDMA technology, CDMA2000 1xEV-DV (Evolution Data/Voice, see CDMA2000 Release C or Release D) and 1xEV-DO (Evolution Data Only Release A) provides integrated voice with simultaneous high-speed packet data services at speeds of up to 3.09 Mbps. The 1xEVDV standard provides packet data and voice in the same carrier, but retains the ability to maintain packet services on a separate carrier if desired. 1xEVDO-A while still focused on data optimization, provides quality of service mechanisms to enable voice over Internet Protocol (IP).

Even with the evolution to faster data rates, there exists a need to provide still further improvements to increase the capacity and data rates to wireless users. Consequently, a CDMA communication system that allows additional users that overcomes the current limitations is needed.

SUMMARY

A method and apparatus for providing increased data communication capacity in a sector of a CDMA wireless system using a combination of code division multiplexing and time division multiplexing is provided. Subsectors within a sector may utilize the same set of Walsh codes to send data to subscribers on the forward channels by utilizing a partial PN sector code offset.

Preferred methods of providing increased capacity include transmitting a first carrier signal in the first subsector. The first carrier uses some or all of the available forward channel spreading codes, or Walsh codes, as suchannels to serve a single user for a time slot. The signal also includes a sector spreading code having a predetermined PN code offset for the sector.

At the same time, a second carrier signal of the same frequency is transmitted in the second subsector. Similarly, the second carrier signal combines a plurality of Walsh codes into subchannels to serve a single user in that subsector for a time slot. The sector spreading code, however, is partially shifted from that of the first subsector.

The partial shift provides a code separation that allows Walsh code reuse in adjacent subsectors of the same sector. The partial shift of the sector PN code is less than a full sector shift, which is typically a multiple of sixty-four chips. Preferably, the partial shift is no more than thirty-two chips, which is one half of a full sector shift. In some embodiments, the partial offset is less than twenty chips.

The Walsh codes that are combined into a single data channel within each subsector may be a subset of the Walsh codes available for traffic channels, or may be all available Walsh codes. The subsectors may be served by fixed beam antennas, phased arrayed antennas, or other smart antenna technology.

Within each subsector, the time division multiplexing may be done by assigning time slots among each group of users in the subsectors using a round-robin scheduling pattern or other types of scheduling algorithms suitable for each group. Alternative scheduling techniques may be used, including assigning time slots in each group depending on the quality of the signal received by each user or commonly referred to as proportional fairness scheduling.

The apparatus for providing increased data communication capacity in a sector of a CDMA wireless system includes a first group of channel elements providing a first composite output, wherein each channel element of the group encodes data onto a Walsh code; a first data buffer means interconnected to said first group of channel elements, for holding queued data intended for transmission in the first subsector; a second group of channel elements providing a second composite output, wherein each channel element of the group encodes data onto a Walsh code; a second data buffer means interconnected to said second group of channel elements, for holding queued data intended for transmission in the second subsector; and a scheduler means connected to said first and second data buffer means for arranging the queued data in the first and second buffer means; wherein the first composite output is encoded with a first sector PN sequence, modulated onto a carrier having a predetermined frequency and transmitted to the first subsector, and the second composite output is encoded with a second sector PN sequence comprising a partially offset replica of the first sector PN sequence, modulated onto a carrier having the same predetermined frequency and transmitted to the second subsector.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

Figure 1:
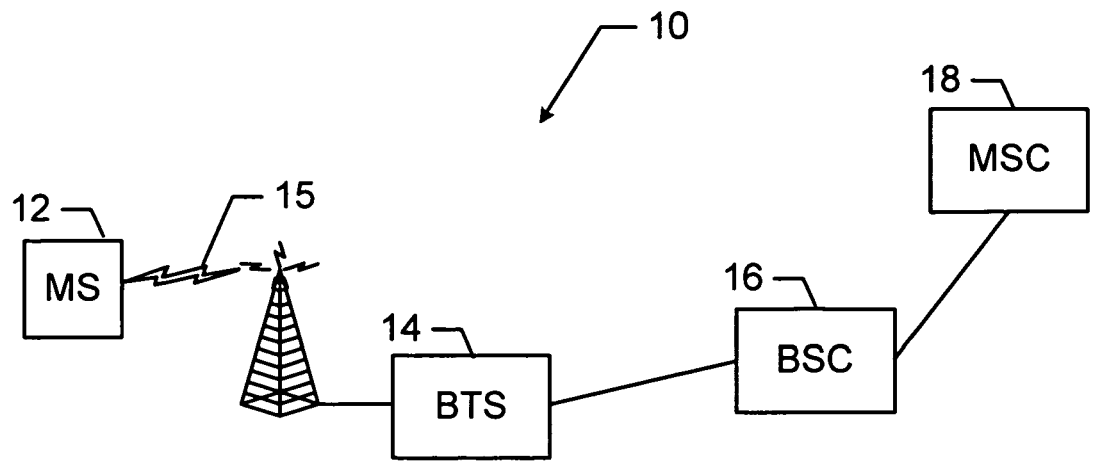
FIG. 1 is a block diagram illustrating one embodiment of a wireless communication system.

A typical wireless communication system 10 is shown in FIG. 1. Mobile station 12 communicates with the mobile switching center 18 (MSC) via base transceiver station 14 (BTS), radio air interface 15, and base station controller 16 (BSC).

Figure 2:
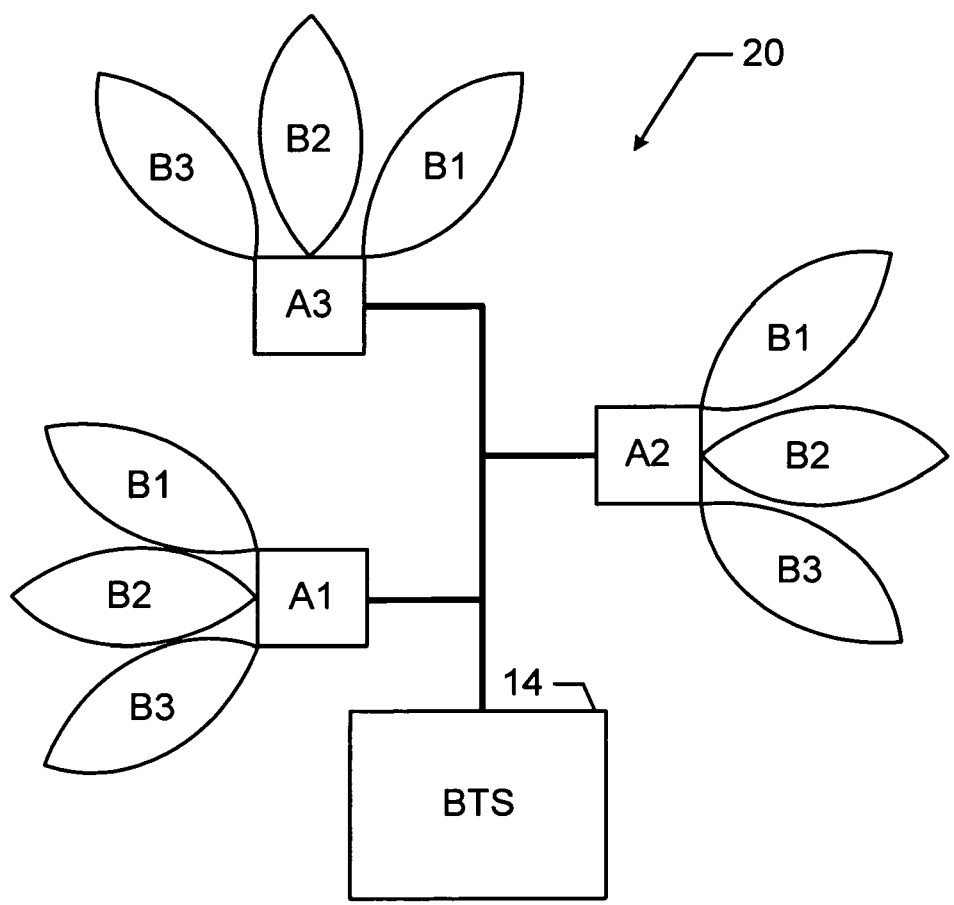
FIG. 2 illustrates a prior art antenna arrangement.

With reference to FIG. 2, antenna system 20 will be described. BTS 14 typically serves a cell having three sectors, depicted as sectors A1, A2, and A3. Each sector is further divided into three subsectors or beamzones, B1, B2, and B3. Typically, the beamzones have very little overlap. In an alternative embodiment, the subsectors may be remotely located from the base station. In particular, the signals intended for transmission may be sent over an available transport mechanism (e.g., digitized and sent over a fiber optic transmission facility) to a remote location, whereupon they may be conditioned for transmission (e.g., reconstituted and amplified).

The beamzones may be formed using fixed beam antenna elements, or a smart antenna may be used to generate the beamzones. A smart antenna may actually be an array of antenna elements working together to produce a particular radiation pattern. Each antenna in the array is referred to as an antenna element (or simply an element). An antenna radiation pattern is also referred to as an antenna-beam or beam zone. A beam width of an antenna is a measure of directivity of an antenna and is usually defined by angles where the radiation pattern reduces to one half of its peak value or more commonly referred to as 3 db points (i.e., 3 decibel power level). Using sophisticated antenna arrays, a given sector may be divided into directional sub-sectors covered by one or more beam zones.

In CDMA communication systems, each sector uses a unique PN code (commonly referred to as a short PN code offset) to distinguish its forward links from surrounding sectors and cells. Within each sector, forward channels are distinguished by yet another code, termed a Walsh code. In an adjacent sector, the Walsh codes may be reused because channel separation is provided by a different offset of the short PN code for that sector. Thus, the number of available forward channels (BTS to MS) on a given carrier frequency in a sector is determined by the number of available Walsh codes. In the ANSI/TIA/EIA-95-B-99 standard entitled "Mobile Station-Base Station Compatibility Standard for Wideband Spread Spectrum Cellular Systems" (published Feb. 1, 1999), the contents of which are incorporated by reference herein, there are sixty-four available Walsh codes, while in CDMA 2000 series (TIA/EIA IS-2000 Series, Rev. A, published Mar. 1, 2000), one hundred twenty-eight Walsh codes are available. The ANSI/TIA/EIA-95-B-99 and the TIA/EIA IS-2000 Series, Rev. A, and Rev. C standards are incorporated herein by reference, and are available from the Telecommunication Industry Association, 2500 Wilson Boulevard, Suite 300, Arlington, Va. 22201.

For the reverse channel, the various PN codes are used in a different manner. First, each MS uses the Walsh codes as a symbol alphabet, whereby up to six data bits may be combined and represented by a single Walsh code. The short code is then applied, and is used for synchronization purposes. Finally, the individual user channels are identified by the offset of the long code. More particularly, the specific long code used to identify the MS's channel is made by "masking" the PN long code by a number determined mathematically by the handset's ESN. With over forty days of 1,228,800 chips/second to choose from, there are billions and billions of reverse traffic channels possible. Of course, reverse access channels are associated with each paging channel in the forward direction, which are publicly-defined long code offsets reserved for reverse-direction public traffic such as call originations, registrations, etc. After a BTS recognizes an MS on an access channel, its identity is known and the BTS redirects the MS to a traffic channel where it will use its own natural long code.

With respect to prior art forward channel schemes described above, each sector of a BTS uses a unique offset of the forward PN sequence. That is, the PN sequence is the same, but is delayed by a predetermined period of time. The time offsets from sector to sector are multiples of the chip interval times sixty-four: (1/1.2288 MHz×64=52.1 microseconds).

Figure 3:
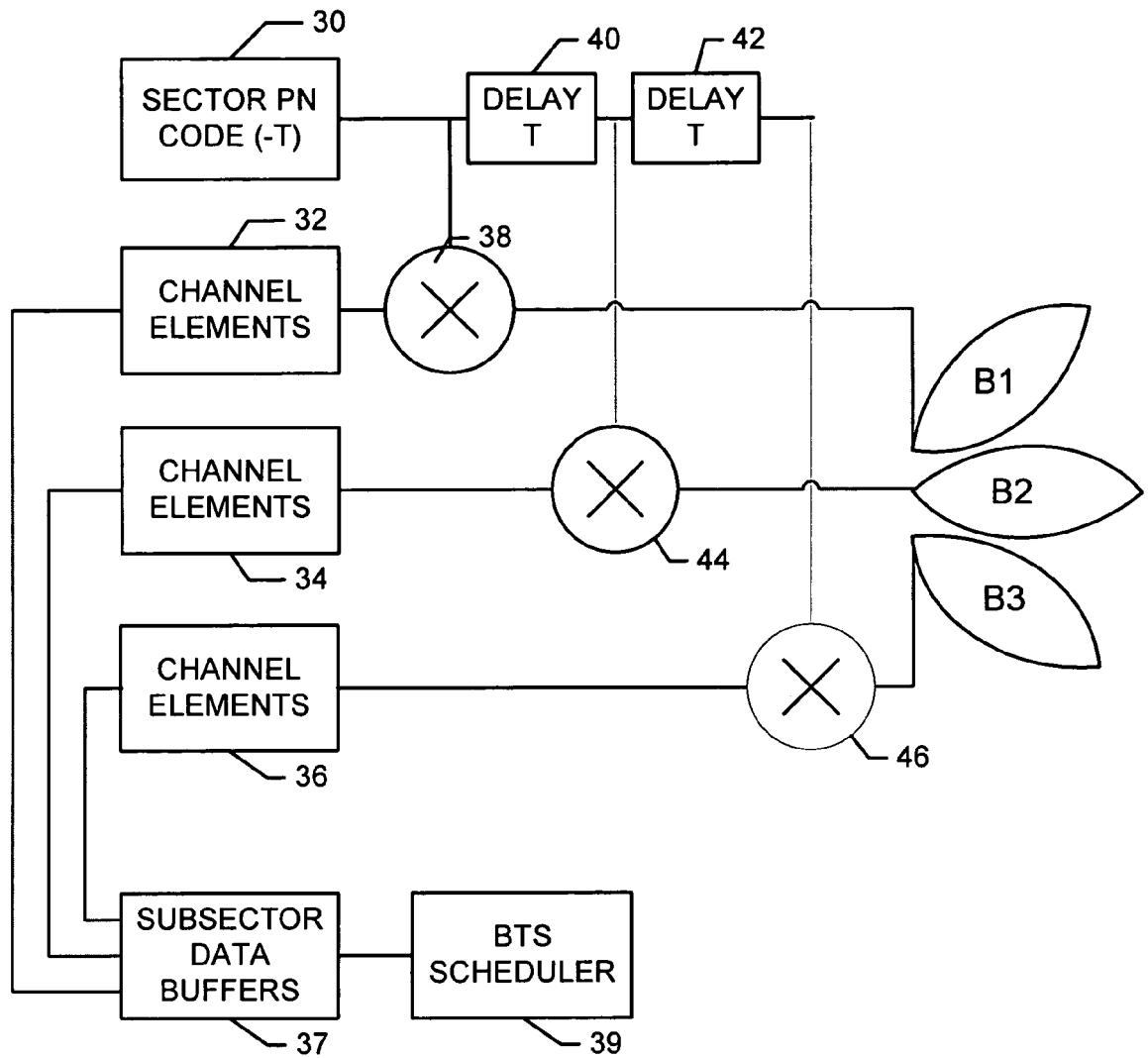
FIG. 3 illustrates a preferred embodiment of a BTS modulator using partial offset sector PN codes.

A preferred embodiment of an improved BTS is shown in FIG. 3. Channel elements provide data modulation signal processing for a single Walsh code. As shown in FIG. 3, the Walsh codes may be combined by summing the outputs of groups of channel elements 32, 34, 36, thereby forming composite output signals, where each group is available for use by a single user during a given time slot. In this embodiment, the group of channel elements provides a data channel to a user, and the individual Walsh codes serve as subchannels within the channel. The Walsh codes may be subset of a Walsh code set, where the subset typically would exclude Walsh codes used for the pilot signal, paging and sync channels, and any other overhead channel.

The data channel provided by channel element group 32 is combined with the sector PN code sequence in multiplier 38. After modulation onto a carrier, the signal is then amplified and provided to an antenna serving beamzone B1. The data channel provided by channel element group 34 is combined with the sector PN code sequence in multiplier 44, after it has been delayed by an amount T. The delay provides a partially offset, or partially shifter replica of the sector PN sequence After modulation onto a carrier, the signal is then provided to an antenna serving beamzone B2. After a further delay T, the sector PN code is also used to encode the channel from channel element group 36. The signal is then modulated onto a carrier and provided to beamzone B3.

The apparatus of FIG. 3 also includes a scheduler module 39, which preferably resides on the BTS 14. The scheduler module 39 preferably operates in conjunction with the operating system of the BTS as a software module running on a central processing unit. The scheduler operates in conjunction with data buffers 37, which may take the form of hardware registers or memory allocated for data transfer operations to the channel elements. The scheduler 39 in conjunction with the data buffers 37 ensure that data for the individual users in a given subsector are delivered to the channel elements in the proper order at the proper time, in accordance with a time-division multiplexing scheduling algorithm. Suitable algorithms implemented by the scheduler 39 include round-robin and proportional fairness scheduling.

While data for a first user is being supplied to the subsector group of channel elements for transmission, data for a second user in that subsector is queued in the subsector buffer 37. Similarly, subsector buffer 37 provides data to the other subsector channel elements and queues data for the inactive users in that subsector.

The sector PN code is partially offset for each of the beamzones (with respect to each other beamzone) in the sector to provide code separation between the zones, thereby allowing Walsh code reuse within the same sector. In some network configurations, the partial PN offset of the sector code may not provide sufficient code separation. Thus, in alternative embodiments, Walsh code re-use may be reserved for non-adjacent subsectors (one or more subsectors are interposed between subsectors that use the same Walsh codes).

In addition, in some preferred embodiments, prior art MS devices will be able to communicate with the improved BTS, which have partially offset PN sector codes in the beamzones. For these embodiments, the MS may use relative timing information when searching for the pilot in a new sector. If the handset is demodulating a BS and goes to measure another (new) BS, the handset calculates the nominal position, in time, of the new BS PN sector code relative to the current BS being demodulated. The handset then searches around the nominal position with-in a search window. A typical search window might be 20 chip lengths. For this reason, it may be desirable to keep the partial PN sector code offsets to less than plus or minus 20 chip periods, or 16 microseconds.

In FIG. 3, the initial sector code may be generated with a partial offset of minus 20 chips, thereby causing a minus 20 chip partial offset in the sector PN code in beamzone B1. Due to the delay by T (20 chips) by delay element 40, the beamzone B2 will have the nominal PN sector code offset. Finally, beamzone B3 will exhibit a plus 20 chip offset. The partial offset may be larger or smaller, depending on the number of subsectors. As long as the offset is inside the search window of the terminal, there are really no limitations to how large or small the offset needs to be. However, there is optimal delays that achieve higher performance theoretically but these would have to be determined in a real implementation of the solution.

Having imposed a code separation between the subsectors using the partial PN sector offset, each subsector is now free to reuse the same set of Walsh codes as those used in adjacent subsectors. In particular, the Walsh codes may be combined into a single channel for high data rate communications with users in a time-division multiple access scheme similar to 1xEVDO or 1xEVDV. The users may be scheduled in each subsector using a round-robin scheduling algorithm. As an alternative, users having the best reception at any given time may be scheduled with priority. Because channel conditions may change rapidly due to channel fading and multipath, each user is periodically expected to have good reception, and to eventually be given priority.

Figure 4:
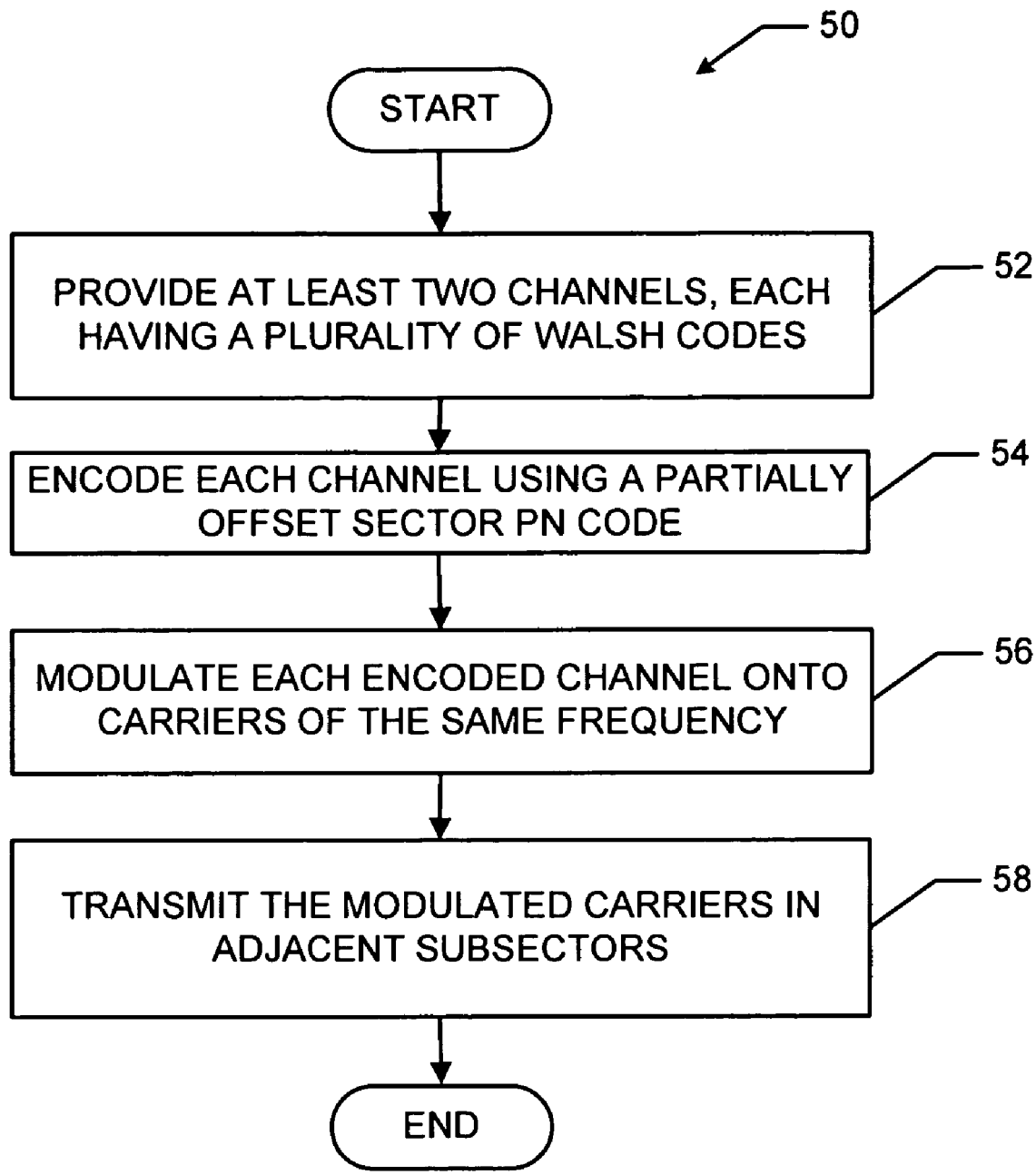
FIG. 4 illustrates a preferred method of providing increased capacity.

With respect to FIG. 4, a preferred method 50 of increasing CDMA wireless capacity will be described. At step 52, two channels are provided. Each of the channels has a plurality of Walsh codes. At least some, if not all, of the Walsh codes are the same codes. At step 54 each of the channels is encoded with a partially offset sector PN code. As described above, one of the PN sector codes may be the nominal offset for that sector, and the other may be relatively partially offset. Alternatively, each may be offset from the nominal offset value. E.g., one may be offset plus ten chips while the other may be offset minus ten chips, resulting in two partially offset PN sector codes, neither of which has the nominal offset. Each of the encoded channels is then modulated onto carriers having the same frequency at step 56, and the modulated carriers are transmitted in adjacent subsectors in step 58.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

I claim:

1. A method of providing increased data communication capacity in a sector of a CDMA wireless system using a combination of code division multiplexing and time division multiplexing, wherein the sector includes at least a first subsector and a second subsector, comprising the steps of:

transmitting a first carrier signal in the first subsector having a plurality of code division multiplexed subchannels and a predetermined PN code offset, wherein the subchannels utilize a set of spreading codes and wherein the plurality of subchannels carry data for one user of a first group of users for an assigned time slot;

simultaneously transmitting a second carrier signal in the second subsector having a plurality of code division multiplexed subchannels and a partially shifted version of the predetermined PN code offset, wherein the subchannels utilize the same set of spreading codes and wherein the plurality of subchannels carry data for one user of a second group of users for an assigned time slot;

wherein the first and second carrier signals utilize the same frequency, and wherein the partially shifted version of the predetermined PN code offset provides a code separation between adjacent subsectors.

2. The method of claim 1 wherein the first carrier signal is transmitted in the first subsector using a fixed beam subsector antenna.

3. The method of claim 2 wherein the first carrier signal is transmitted in the first subsector using a phased array subsector antenna.

4. The method of claim 1 wherein the partially shifted version of the predetermined PN code offset comprises the predetermined PN code with an offset of no more than thirty-two chip periods.

5. The method of claim 1 wherein the partially shifted version of the predetermined PN code offset comprises the predetermined PN code with an offset of no more than twenty chip periods.

6. The method of claim 1 wherein the sets of spreading codes used in the subchannels of the first carrier and second carrier are subsets of a Walsh code set.

7. The method of claim 6 wherein the set of spreading codes used in the subchannels of the first carrier and second carrier are the same subset of a Walsh code set.

8. The method of claim 1 wherein the sets of spreading codes used in the subchannels of the first carrier and second carrier is the set of all Walsh codes reserved for data traffic transmissions.

9. The method of claim 1 wherein the first subsector and second subsector are adjacent.

10. The method of claim 1 wherein the assigned time slots are assigned among each of the first and second groups of users using a round-robin scheduling pattern for each group.

11. The method of claim 1 wherein the assigned time slots are assigned among each of the first and second groups of users depending on the quality of the signal received by each user.

12. An apparatus for providing increased data communication capacity in a sector of a CDMA wireless system using a combination of code division multiplexing and time division multiplexing, wherein the sector includes at least a first subsector and a second subsector, comprising:
- a first group of channel elements providing a first composite output, wherein each channel element of the group encodes data onto a Walsh code;
- a first data buffer means interconnected to said first group of channel elements, for holding queued data intended for transmission in the first subsector;
- a second group of channel elements providing a second composite output, wherein each channel element of the group encodes data onto a Walsh code;
- a second data buffer means interconnected to said second group of channel elements, for holding queued data intended for transmission in the second subsector;
- a scheduler means connected to said first and second data buffer means for arranging the queued data in the first and second buffer means; and
- wherein the first composite output is encoded with a first sector PN sequence, modulated onto a carrier having a predetermined frequency and transmitted to the first subsector, and the second composite output is encoded with a second sector PN sequence comprising a partially offset replica of the first sector PN sequence, modulated onto a carrier having the same predetermined frequency and transmitted to the second subsector.

13. The apparatus of claim 12 wherein the first and second subsectors are served by fixed beam subsector antennas.

14. The apparatus of claim 12 wherein the first and second subsectors are served by phased array subsector antennas.

15. The apparatus of claim 12 wherein the partially offset replica has an offset of no more than thirty-two chip periods.

16. The apparatus of claim 12 wherein the partially offset replica has an offset of no more than twenty chip periods.

17. The apparatus of claim 12 wherein the Walsh codes used in the first and second group of channel elements are subsets of a Walsh code set.

18. The apparatus of claim 17 wherein the subsets of Walsh code set used in the first and second group of channel elements are the same subset of a Walsh code set.

19. The apparatus of claim 12 wherein sets of spreading codes used in subchannels of the first carrier and second carrier is the set of all Walsh codes reserved for data traffic transmissions.

20. The apparatus of claim 12 wherein the first subsector and second subsector are adjacent.

21. The apparatus of claim 12 wherein the scheduler means arranges the queued data in the first and second buffer means based on a round-robin scheduling pattern for each group.

22. The apparatus of claim 12 wherein the scheduler means arranges the queued data in the first and second buffer means based on the quality of the signal received by each user.

* * * * *